(12) United States Patent
Sabetti et al.

(10) Patent No.: US 9,994,079 B2
(45) Date of Patent: Jun. 12, 2018

(54) WINTER TYRE TREAD BAND WITH THREE-DIMENSIONAL SIPES

(71) Applicants: Emiliano Sabetti, Rome (IT); Massimo Mangia, Basiglio (IT)

(72) Inventors: Emiliano Sabetti, Rome (IT); Massimo Mangia, Basiglio (IT)

(73) Assignee: BRIDGESTONE CORPORATION, Chuo-ku, Tokyo (JP)

(*) Notice: Subject to any disclaimer, the term of this patent is extended or adjusted under 35 U.S.C. 154(b) by 414 days.

(21) Appl. No.: 14/432,778

(22) PCT Filed: Oct. 7, 2013

(86) PCT No.: PCT/IB2013/059182
§ 371 (c)(1),
(2) Date: Apr. 1, 2015

(87) PCT Pub. No.: WO2014/054038
PCT Pub. Date: Apr. 10, 2014

(65) Prior Publication Data
US 2015/0258860 A1    Sep. 17, 2015

(30) Foreign Application Priority Data
Oct. 5, 2012   (IT) .............................. TO2012A0871

(51) Int. Cl.
*B60C 11/12*    (2006.01)
*B60C 11/11*    (2006.01)
*B29D 30/06*    (2006.01)

(52) U.S. Cl.
CPC ...... *B60C 11/1218* (2013.01); *B29D 30/0606* (2013.01); *B60C 11/11* (2013.01);
(Continued)

(58) Field of Classification Search
CPC ......... B60C 2011/1213; B60C 11/1218; B60C 2011/1227; B60C 11/1222
(Continued)

(56) References Cited

U.S. PATENT DOCUMENTS 5,783,002 A    7/1998   Lagnier

FOREIGN PATENT DOCUMENTS

EP    1 669 217 A1    6/2006
EP    1 769 946 A1    4/2007
(Continued)

OTHER PUBLICATIONS

Communication dated May 24, 2016 from the State Intellectual Property Office of the P.R.C. issued in corresponding Application No. 201380059975.5.
(Continued)

*Primary Examiner* — Timothy Kennedy
(74) *Attorney, Agent, or Firm* — Sughrue Mion, PLLC (57) ABSTRACT

A winter tire tread band having: a number of longitudinal and transverse grooves defining a number of blocks, each projecting radially upwards from a base surface of the tread band; and a number of sipes formed in at least some of the blocks, and each of which extends radially inwards of a corresponding block, from a top surface forming the rolling surface of the tread band; each sipe has a wave pattern when the corresponding block is viewed in any one of three planes perpendicular to one another and defined by a longitudinal axis, a transverse axis, and a radial axis.

12 Claims, 10 Drawing Sheets

(52) U.S. Cl.
CPC .. *B60C 11/1204* (2013.01); *B29D 2030/0613* (2013.01); *B60C 2011/1213* (2013.01); *B60C 2011/1227* (2013.01)

(58) Field of Classification Search
USPC .................................................. 152/209.18
See application file for complete search history.

(56) References Cited

FOREIGN PATENT DOCUMENTS

| | | |
|---|---|---|
| EP | 1 987 964 A1 | 11/2008 |
| EP | 2 058 145 A1 | 5/2009 |
| EP | 2 070 731 A1 | 6/2009 |
| JP | 2002-321509 A | 11/2002 |
| JP | 2006-123636 A | 5/2006 |
| WO | 96/01190 A1 | 1/1996 |

OTHER PUBLICATIONS

International Search Report for PCT/IB2013/059182 dated Jan. 3, 2014.

WINTER TYRE TREAD BAND WITH THREE-DIMENSIONAL SIPES

CROSS REFERENCE TO RELATED APPLICATIONS

This application is a National Stage of International Application No. PCT/IB2013/059182 filed Oct. 7, 2013, claiming priority based on Italian Patent Application No. TO2012A000871 filed Oct. 5, 2012, the contents of all of which are incorporated herein by reference in their entirety.

TECHNICAL FIELD

The present invention relates to a winter tyre tread band. The tread band has sipes formed in the tread blocks and extending radially inwards of the blocks from a rolling surface.

BACKGROUND ART

One of the most important characteristics of a winter tyre is its grip on snow (i.e. a snow-covered surface), and therefore its ability to generate sufficient friction as it rolls over the snow-covered surface. The total friction generated between a tyre and a snow-covered surface is the sum of a digging force—produced by the tyre tread penetrating the snow—and a shearing force—produced by friction between the snow trapped by the tyre tread (in particular, in the tread grooves) and the snow on the snow-covered surface. To increase the shearing force, it is necessary to increase the amount of snow trapped (gripped) by the tyre tread, so the tread has a number of normally zig-zag-patterned sipes extending radially inwards of the blocks from the rolling surface.

The presence of the sipes, however, also has negative aspects, in that, while improving performance on snow or ice, it also impairs performance on dry or (to a lesser extent) wet surfaces. More specifically, the presence of the sipes greatly increases the flexibility of the tread blocks transversely (i.e. axially, i.e. parallel to the rolling axis of the tyre), and longitudinally (i.e. circumferentially, i.e. tangent to the tyre circumference), and so greatly increases deformation of the tread blocks when subjected to transverse forces (when cornering) or longitudinal forces (when braking or accelerating). Severe deformation of the tread blocks by transverse or longitudinal forces is invariably negative, by reducing the contact area between the rolling surface (i.e. the outer surface of the tread blocks) and the road surface, thus reducing the total force the tyre is able to transmit to the road surface.

Patent Application EP1669217A1 describes a winter tyre tread band comprising: a number of longitudinal and transverse grooves, which define a number of blocks, each projecting radially upwards from a base surface of the tread band; and a number of sipes formed in at least some of the blocks, and each extending radially inwards of a corresponding block from a top surface forming a rolling surface of the tread band. In Patent Application EP1669217A1, each sipe is formed starting with a wave pattern in a plane defined by the longitudinal axis Tc and transverse axis Tw, and by moving this wave pattern along the radial axis Tr and at the same time in undulating fashion along the longitudinal axis Tc only.

The sipes described in Patent Application EP1669217A1 increase the rigidity of the blocks along the longitudinal axis Tc and transverse axis Tw, by having a dual wave pattern in both the plane defined by the longitudinal axis Tc and transverse axis Tw, and the plane defined by the longitudinal axis Tc and radial axis Tr.

Patent Application EP1987964A1 discloses a pneumatic tire including blocks on its tread which are segmented by plural circumferential grooves extending along a tire circumferential direction and plural lateral grooves extending along a tread width direction; circumferential sipes extending along the tire circumferential direction are provided in the blocks. Inside circumferential sipes extend straight along a tire radial direction and outside circumferential sipes extend along the tire radial direction in zigzag patterns.

Patent Application EP1987964A1 discloses a pneumatic tire including blocks on its tread which are segmented by plural circumferential grooves extending along a tire circumferential direction and plural lateral grooves extending along a tread width direction; circumferential sipes extending along the tire circumferential direction are provided in the blocks. Inside circumferential sipes extend straight along a tire radial direction and outside circumferential sipes extend along the tire radial direction in zigzag patterns.

DESCRIPTION OF THE INVENTION

It is an object of the present invention to provide a winter tyre tread band designed to eliminate the above drawbacks, and which therefore has blocks of superior rigidity along both the longitudinal and transverse axes, and which at the same time is cheap and easy to produce.

According to the present invention, there is provided a winter tyre tread band as claimed in the accompanying Claims.

BRIEF DESCRIPTION OF THE DRAWINGS

A non-limiting embodiment of the present invention will be described by way of example with reference to the attached drawings, in which.

PREFERRED EMBODIMENTS OF THE INVENTION

Figure 1:
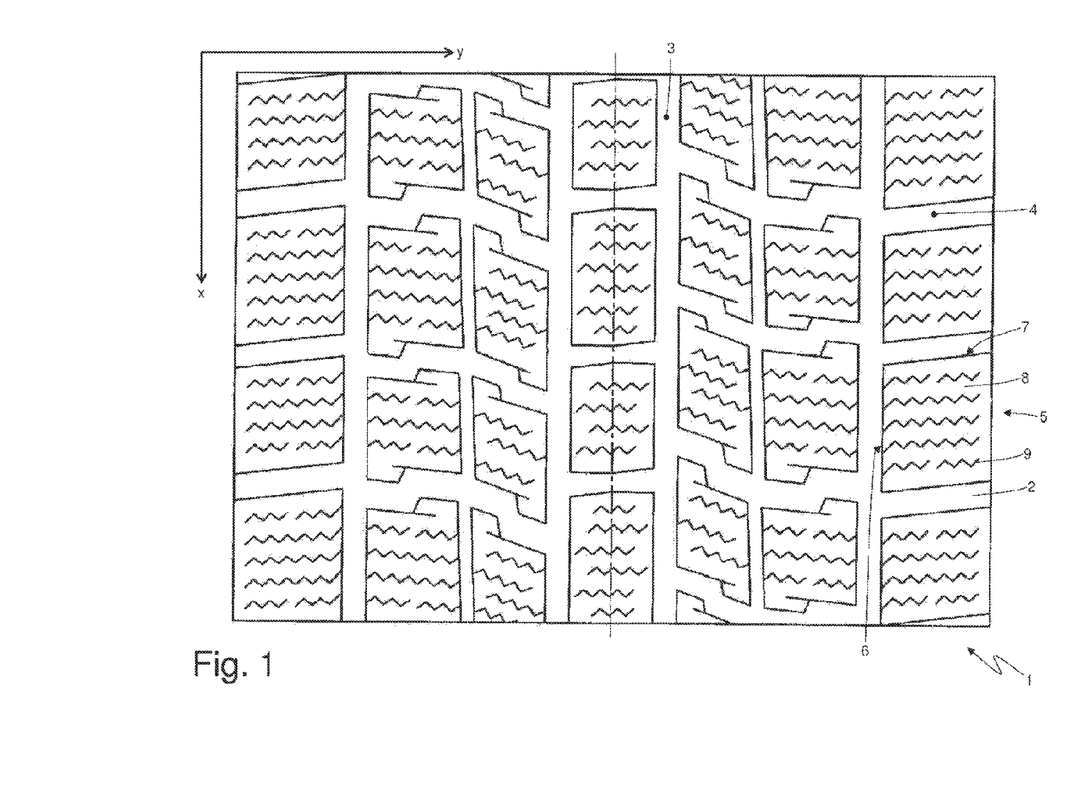
FIG. 1 shows a schematic of a portion of winter tyre tread band in accordance with the present invention.

Number 1 in FIG. 1 indicates as a whole a winter tyre tread band. Tread band 1 has a toroidal base surface 2 extending about a central axis of rotation.

Tread band 1 has a raised pattern, which projects radially upwards from base surface 2 and is bounded by a number of longitudinal (or circumferential) grooves 3 (i.e. extending crosswise to the axis of rotation, along the circumference of the tread), and by a number of transverse (or axial) grooves 4 (i.e. parallel to the axis of rotation and therefore perpendicular to longitudinal grooves 3). Longitudinal grooves 3 and transverse grooves 4 define a number of blocks 5, which project radially upwards from base surface 2 of tread band 1. Each block 5 is roughly parallelepiped-shaped with a rectangular cross section, and comprises two longitudinal lateral surfaces 6 perpendicular to base surface 2 and which, on the inner blocks 5, bound two corresponding longitudinal grooves 3; two transverse lateral surfaces 7 perpendicular to base surface 2 and which bound two corresponding transverse grooves 4; and a top surface 8 parallel to base surface 2 and which defines a rolling surface which, in use, rests directly on the road surface on which the tyre rolls.

Figure 2:
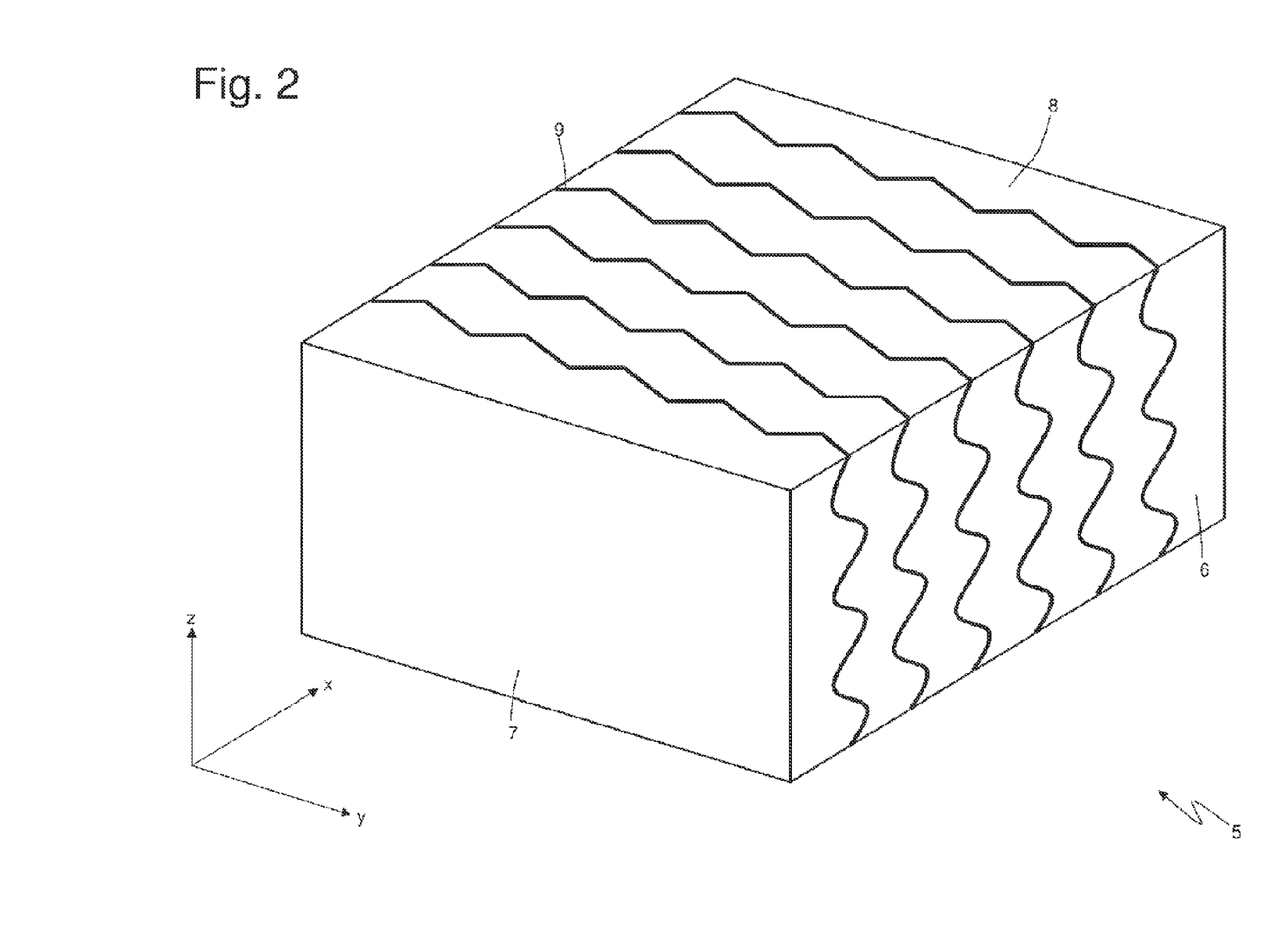
FIG. 2 shows a larger-scale, schematic view in perspective of a block, with radial sipes, of the FIG. 1 tread band.

As shown in FIG. 2, each block 5 has zig-zag-shaped radial sipes 9 formed radially through top surface 8 of block 5. In other words, each sipe 9 extends radially (i.e. in a radial direction) inwards of corresponding block 5 from top surface 8 (i.e. from the rolling surface).

Figure 3:
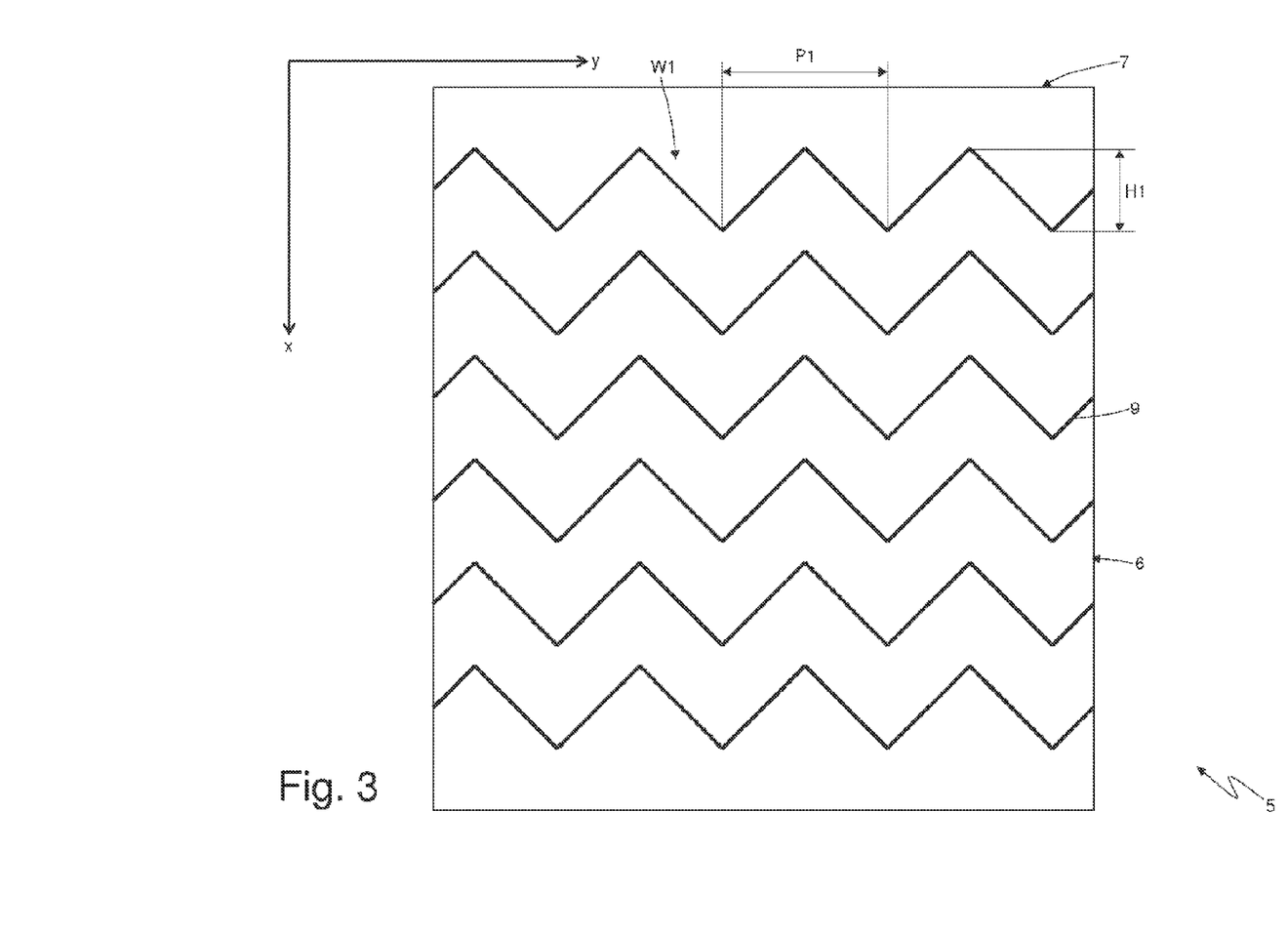
FIG. 3 shows a top plan view (i.e. in an XY plane) of the FIG. 2 block, showing a wave pattern of the sipes in the XY plane.
Figure 4:
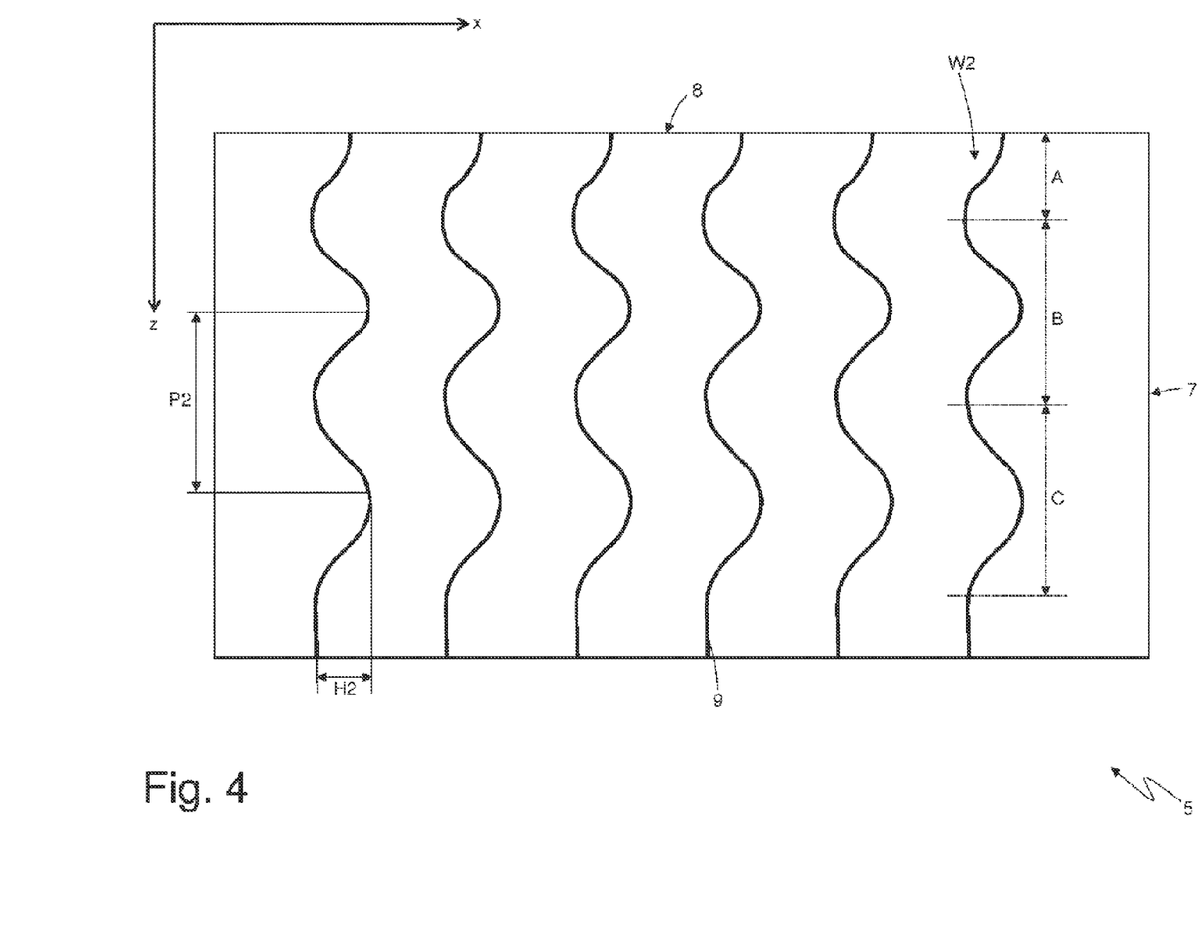
FIG. 4 shows a side view (i.e. in a ZX plane) of the FIG. 2 block, showing a wave pattern of the sipes in the ZX plane.
Figure 5:
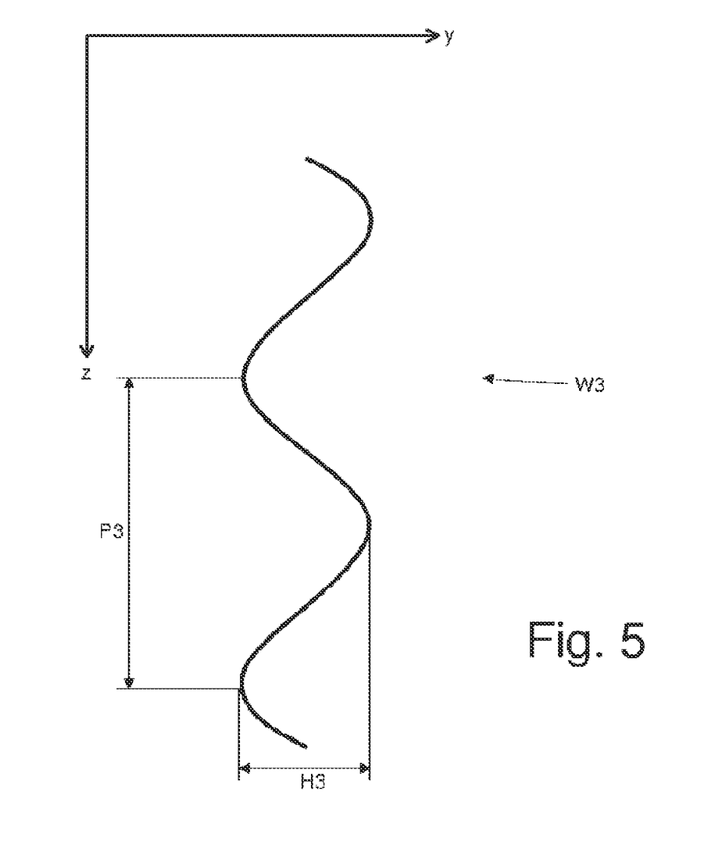
FIG. 5 shows a wave pattern of the FIG. 2 block sipes in the YZ plane.

As shown in FIGS. 3-5, each sipe 9 has a wave pattern W1, W2, W3 in any one of three planes XY, ZX, YZ perpendicular to one another and defined by a longitudinal (i.e. circumferential) axis x (i.e. tangent to the tyre circumference), by a transverse (i.e. axial) axis y (i.e. parallel to the rolling axis of the tyre and therefore perpendicular to longitudinal axis x), and by a radial axis z (i.e. perpendicular to longitudinal axis x and transverse axis y). In other words, each sipe 9 has a wave pattern W1 when block 5 is viewed (as in FIG. 3) in a plane XY defined by longitudinal axis x and transverse axis y (i.e. when viewed from above); each sipe 9 has a wave pattern W2 when block 5 is viewed (as in FIG. 4) in a plane ZX defined by radial axis z and longitudinal axis x (i.e. when viewed from the side); and each sipe 9 has a wave pattern W3 when block 5 is viewed (as in FIG. 5) in a plane YZ defined by transverse axis y and radial axis z.

In other words, in plane XY, each sipe 9 has a wave pattern W1, which is the same even if block 5 is sectioned along any plane parallel to plane XY, i.e. at any radial point z of block 5. At different radial points z, wave pattern W1 in plane XY remains the same (i.e. is the same shape, i.e. remains undeformed), but shifts (translates) along longitudinal axis x in wave pattern W2, and along transverse axis y in wave pattern W3. In other words, each sipe 9 is formed starting with a wave pattern W1 in the XY plane, and by moving wave pattern W1 parallel to itself (i.e. with no change in shape or orientation) along radial axis z, and at the same time along transverse axis y in wave pattern W2, and along longitudinal axis x in wave pattern W3 (with no change in the shape of wave pattern W1).

In a preferred embodiment, the three wave patterns W1, W2, W3 differ in shape and/or size.

As shown in FIG. 3, wave pattern W1 of sipes 9 in plane XY is a piecewise-linear (i.e. zig-zag line) comprising a succession of straight segments at angles to one another. Preferably, the pitch (period) P1 of wave pattern W1 ranges between 3 and 4 mm, and the amplitude H1 of wave pattern W1 ranges between 1.2 and 2.0 mm.

As shown in FIG. 4, wave pattern W2 of sipes 9 in plane ZX is a piecewise-linear with a curve joining each up and down slope (alternatively, it may be a piecewise-linear with sharp angles, i.e. no connecting curves, which improves performance, but is more complicated to produce). Preferably, the pitch (period) P2 of wave pattern W2 ranges between 2 and 3 mm, and the amplitude H2 of wave pattern W2 ranges between 0.6 and 1.0 mm.

As shown in FIG. 5, wave pattern W3 of sipes 9 in plane YZ is a piecewise-linear with a curve joining each up and down slope (alternatively, it may be a piecewise-linear with sharp angles, i.e. no connecting curves, which improves performance, but is more complicated to produce). Preferably, the pitch (period) P3 of wave pattern W3 ranges between 1.5 and 2.0 mm, and the amplitude H3 of wave pattern W3 ranges between 0.5 and 0.9 mm.

As shown in FIG. 4, wave pattern W2 of sipes 9 in plane ZX comprises a half-wave A (i.e. half of a whole wave) which originates at top (i.e. rolling) surface 8 of block 5; and two successive whole waves B and C after half-wave A. The amplitude H2 of half-wave A is less than (preferably about half) the amplitude H2 of the two whole waves B and C. And the pitch (period) P2 of half-wave A differs from that of the two whole waves B and C. By way of example, half-wave A has a pitch (period) P2 of about 1.8 mm (referring, of course, to the whole wave); whole wave B has a pitch (period) P2 of about 2.7 mm; and whole wave C has a pitch (period) P2 of about 3.1 mm.

When block 5 is subjected to longitudinal force (i.e. a force directed longitudinally along longitudinal axis x, and therefore an accelerating or braking force), wave pattern W2 of sipes 9 in plane ZX produces an interlocking interaction between the two facing surfaces of each sipe 9, and the interlocking forces exchanged between the two facing surfaces of each sipe 9 have two positive effects:

1. The longitudinal component (parallel to the road surface) of the interlocking forces exchanged between the two facing surfaces of each sipe 9 directly increases the longitudinal rigidity of block 5.

2. The radial component (perpendicular to the road surface) of the interlocking forces exchanged between the two facing surfaces of each sipe 9 generates reaction moments that eliminate or at least reduce the deforming moments which tend to deform block 5 radially (radial deformation of block 5 has negative effects by tending to reduce the contact area between the top surface 8 of block 5 and the road surface).

The two whole waves B and C in wave pattern W2 of sipes 9 in plane ZX are normally designed to optimize the above two effects.

Figure 6:
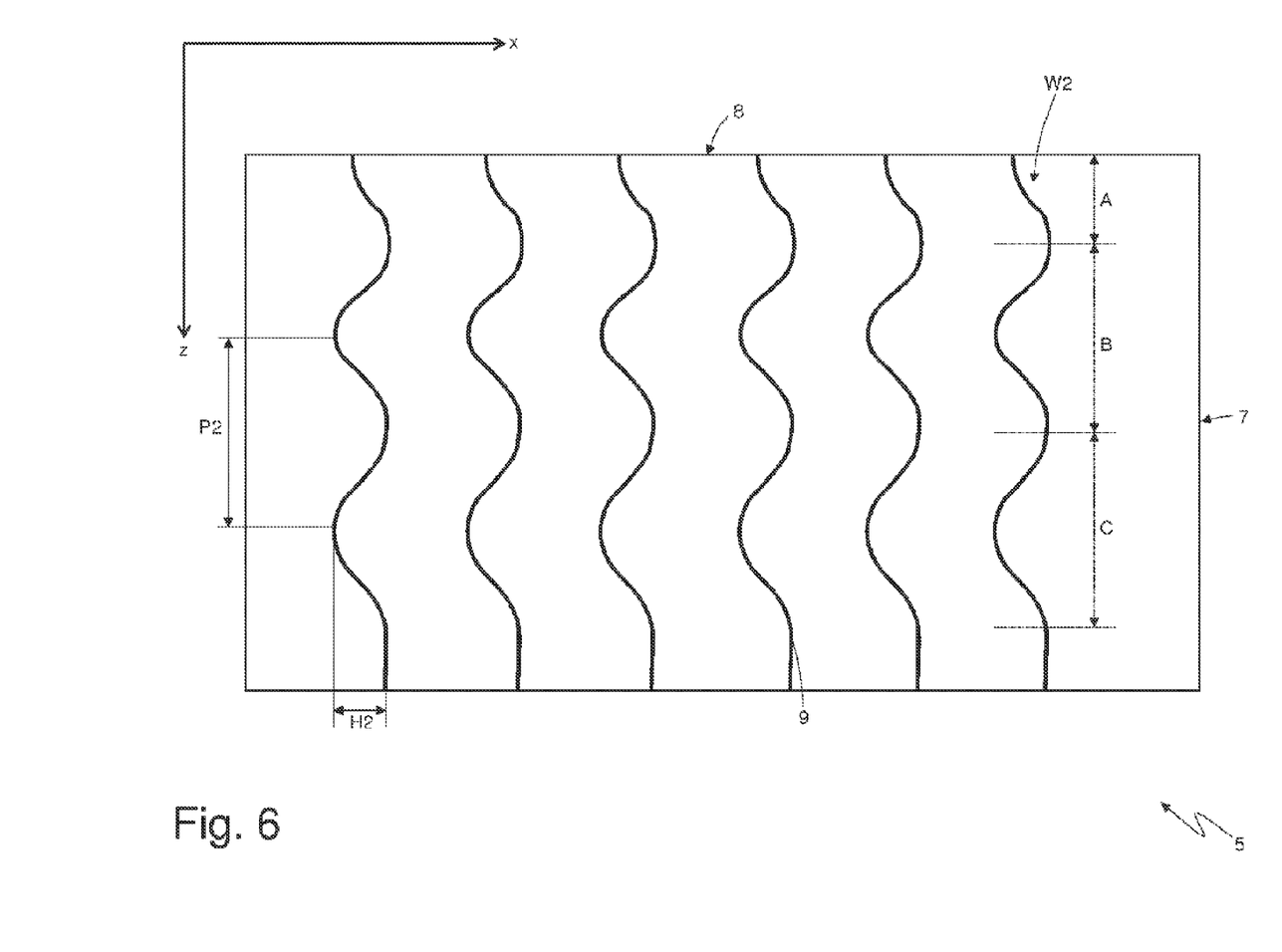
FIG. 6 shows a side view (i.e. in a ZX plane) of a different embodiment of the FIG. 2 block, showing a wave pattern of the sipes in the ZX plane.
Figure 9:
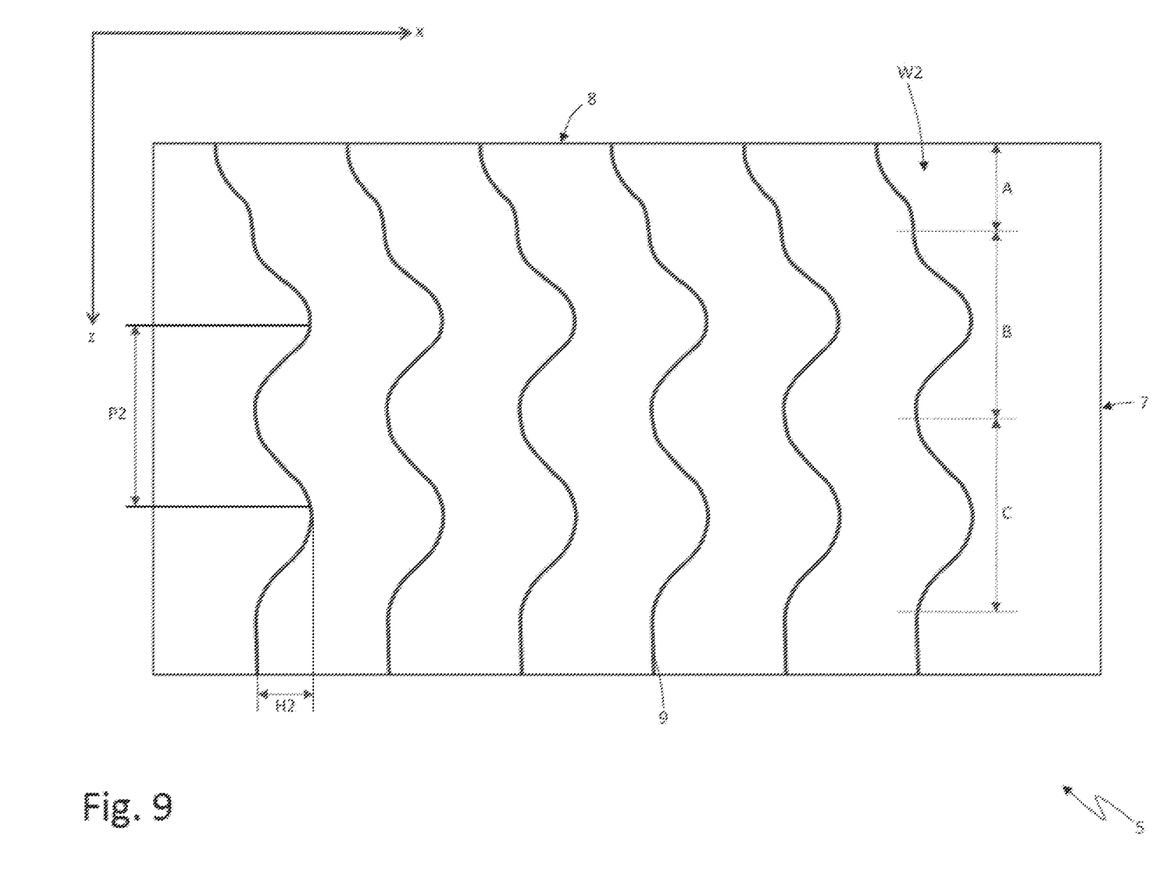
FIG. 9 shows a side view of a block, showing a wave pattern of the sipes in the ZX plane according to an embodiment of the invention.
Figure 10:
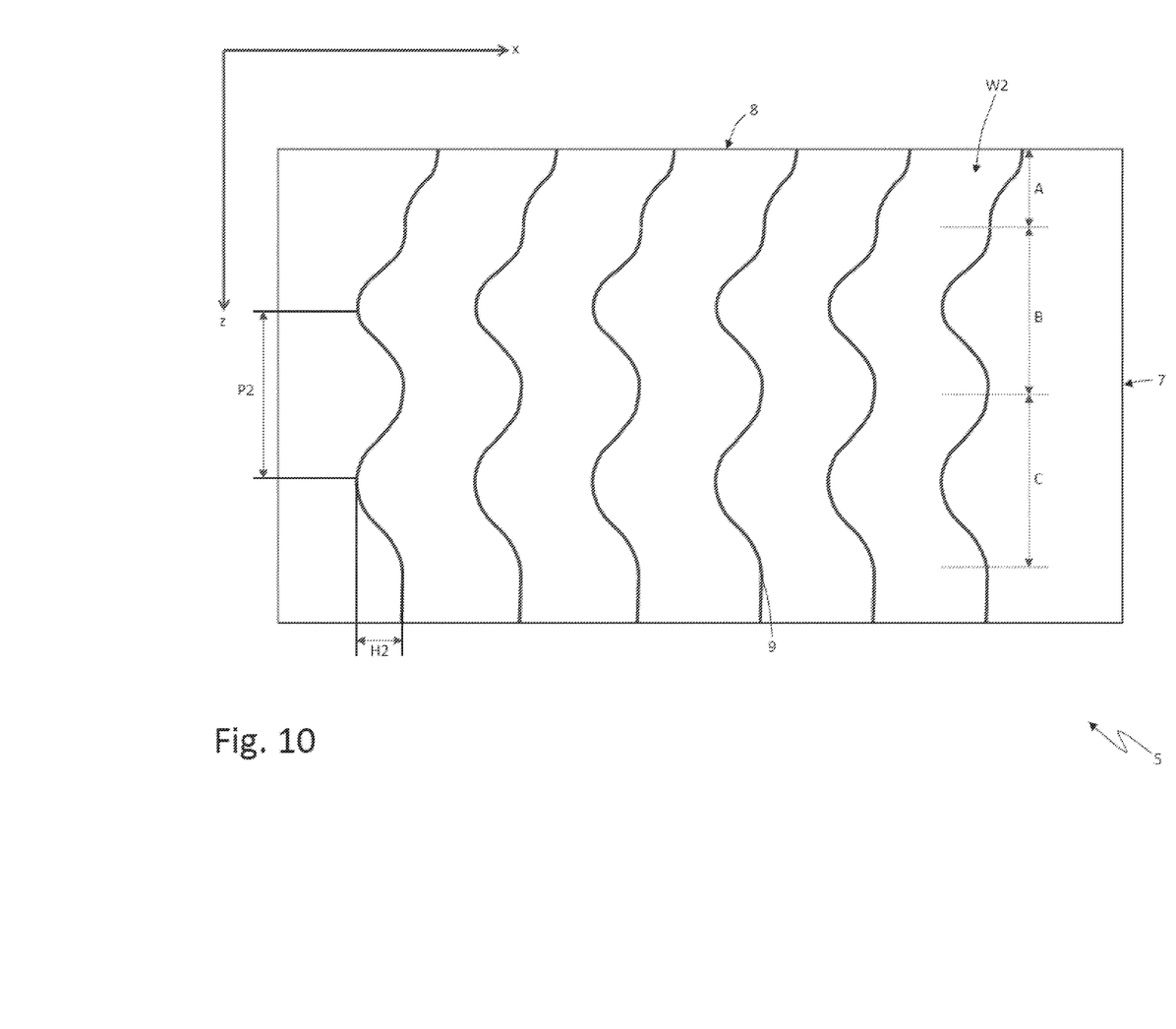
FIG. 10 shows a side view of a block, showing a wave pattern of the sipes in the ZX plane according to another embodiment of the invention.

The main purpose of half-wave A in wave pattern W2 of sipes 9 in plane ZX is to increase the reaction moments opposing the deforming moments, which is achieved by increasing the application distance (and therefore the 'arm') of the interlocking forces exchanged between the two facing surfaces of each sipe 9. It is important to note that the above function—of increasing the reaction moments—of half-wave A in wave pattern W2 of sipes 9 in plane ZX is directional, i.e. only operates in the event of longitudinal or transverse stress, depending on the orientation of half-wave A. In other words, if half-wave A is oriented as shown in FIG. 4, the above function of increasing the reaction moments only operates in the event of longitudinal stress when accelerating; whereas, if half-wave A is oriented as shown in FIG. 6, the above function—of increasing the reaction moments—only operates in the event of longitudinal stress when braking. It is important to note that half-wave A in FIG. 4 is specular with respect to half-wave A in FIG. 6. The two whole waves B and C are potentially independent of half-wave A, and must be oriented according to set aims: if wave pattern W2 of sipes 9 in plane ZX is designed to maximize performance in only one longitudinal direction (i.e. only when accelerating or braking), the two whole waves B and C and half-wave A always face the same way; whereas, if wave pattern W2 of sipes 9 in plane ZX is designed for compromise, the two whole waves B and C face the opposite way to half-wave A as illustrated in FIGS. 9 and 10 (i.e. the two whole waves B and C are oriented to maximize braking or dry-pavement traction, and half-wave A is oriented the opposite way to maximize traction or braking on snow).

To allow for the directionality of the effects of half-wave A in wave pattern W2 of sipes 9 in plane ZX, the centre blocks 5 (i.e. located along or close to the centreline of tread band 1) may differ from the lateral blocks 5 (i.e. located along or close to the shoulders of tread band 1): centre blocks 5, which are subjected to greater longitudinal acceleration forces, have the wave pattern W2 of sipes 9 in plane ZX as shown in FIG. 4 (to optimize traction); whereas lateral blocks 5, which are subjected to greater longitudinal braking forces, have the wave pattern W2 of sipes 9 in plane ZX as shown in FIG. 6 (to optimize braking).

Half-wave A of wave pattern W2 of sipes 9 has also been found to act as a micro-digger in snow (obviously, on snow-covered surfaces), thus increasing the amount of snow trapped in sipes 9, and also (slightly) improving performance on snow or ice.

In the FIG. 4 embodiment, in each block 5, wave pattern W2 of sipes 9 in plane ZX stops just short of base surface 2 (i.e. at the bottom of block 5), and, over the last piece (i.e. over the last 0.3-0.5 mm before base surface 2), sipes 9 in plane ZX are straight (i.e. have no waves). In a different embodiment not shown, wave pattern W2 of sipes 9 in plane ZX is maintained seamlessly from top surface 8 (i.e. the top of block 5) to base surface 2 (i.e. the bottom of block 5). In other words, in each block 5, wave pattern W2 of sipes 9 in plane ZX extends the full radial depth of block 5.

In the FIG. 5 embodiment, in each block 5, wave pattern W3 of sipes 9 in plane YZ is maintained seamlessly from top surface 8 (i.e. the top of block 5) to base surface 2 (i.e. the bottom of block 5). In other words, in each block 5, wave pattern W3 of sipes 9 in plane YZ extends the full radial depth of block 5. In a different embodiment not shown, wave pattern W3 of sipes 9 in plane YZ stops just short of base surface 2 (i.e. at the bottom of block 5), and, over the last piece (i.e. over the last 0.3-0.5 mm before base surface 2), sipes 9 in plane YZ are straight (i.e. have no waves).

Figure 7:
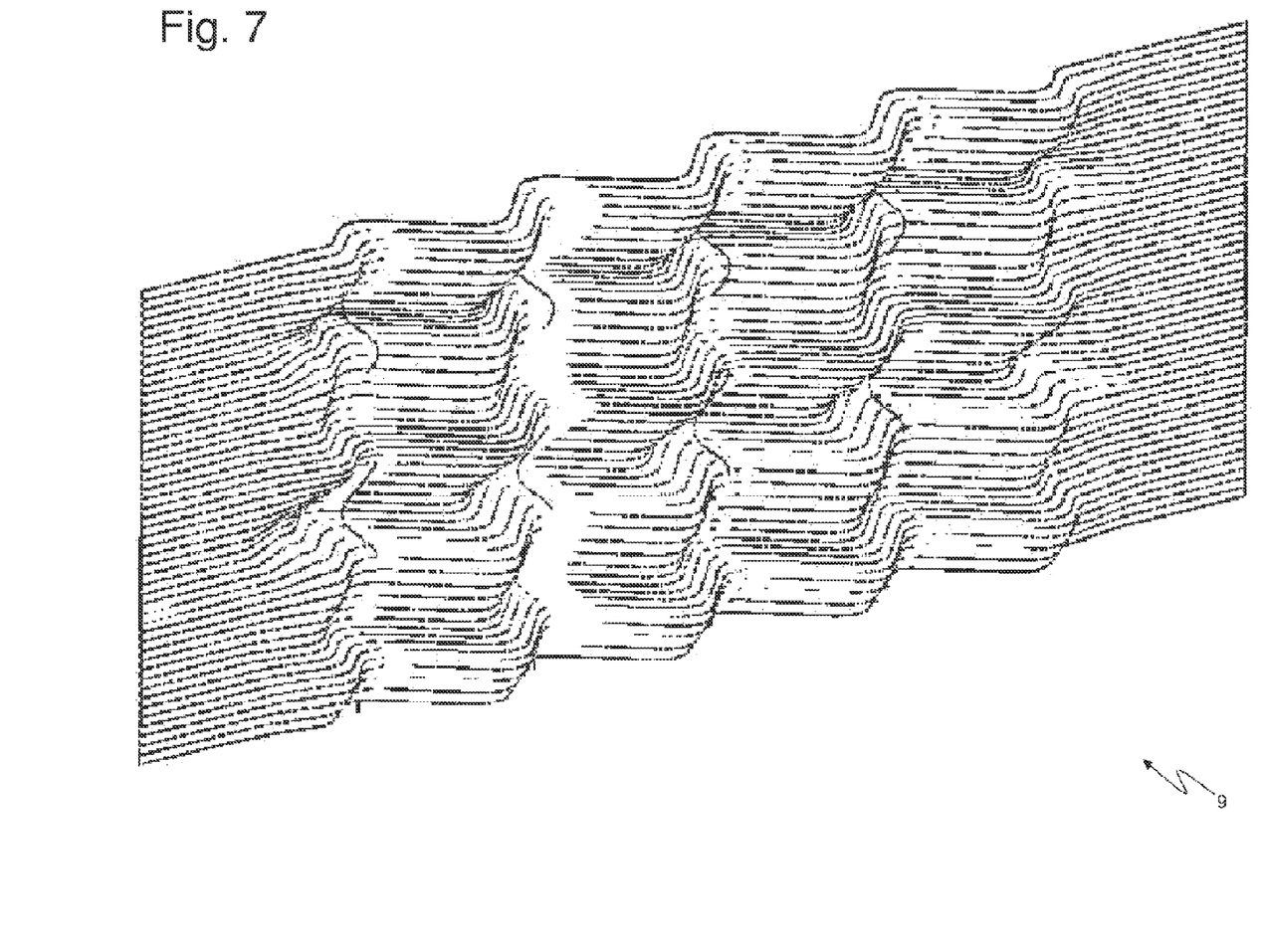
FIG. 7 shows a view in perspective of a sipe in a FIG. 1 tread band block.

FIG. 7 shows a three-dimensional view of a sipe 9.

The winter tyre tread band 1 described has numerous advantages.

Firstly, compared with a similar conventional tread band, tread band 1 described performs well on snow or ice, by virtue of sipes 9, while at the same time performing much better on wet and dry pavements. This is achieved by virtue of the design of sipes 9, which have a wave pattern W1, W2, W3 when block 5 is viewed in any one of three perpendicular planes XY, ZX. YZ.

Wave pattern W1 in plane XY is purely conventional, and serves solely to trap more snow on snow-covered surfaces. Whereas wave patterns W2 and W3 in respective planes ZX and YZ serve solely to increase the rigidity of blocks 5 along transverse axis y (to improve performance when cornering), and along longitudinal axis x (to improve performance when accelerating and braking), by increasing interlocking between the two facing surfaces of each sipe 9. It is important to note that wave pattern W2 in plane ZX mainly serves to increase the rigidity of blocks 5 along longitudinal axis x, but, by working synergically with wave pattern W3 in plane YZ, also aids in increasing the rigidity of blocks 5 along transverse axis y. Similarly, wave pattern W3 in plane YZ mainly serves to increase the rigidity of blocks 5 along transverse axis y, but, by working synergically with wave pattern W2 in plane ZX, also aids in increasing the rigidity of blocks 5 along longitudinal axis x.

Figure 8:
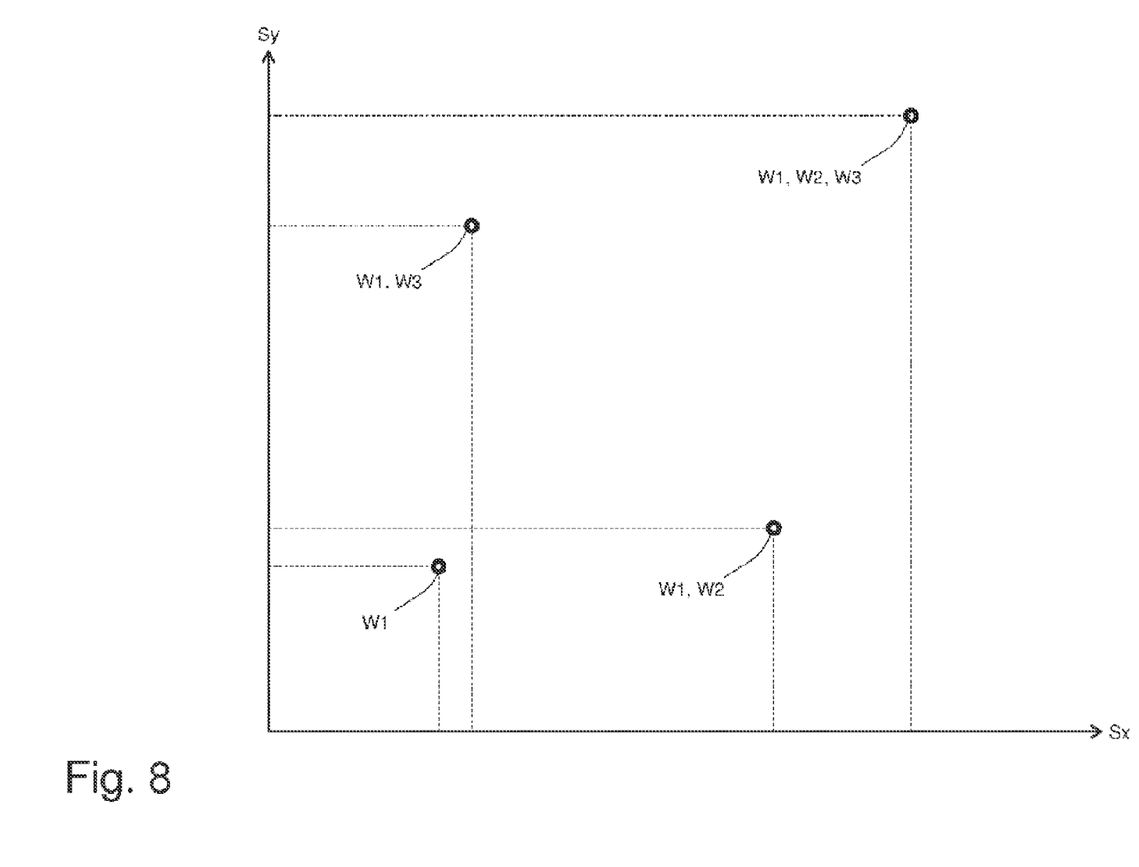
FIG. 8 shows a graph illustrating the improvement in rigidity achievable by the present invention.

Numeric simulations and tests have shown wave patterns W2 and W3 in respective planes ZX and YZ to have a synergical effect, i.e. when combined, their effects increase far in excess of their algebraic sum. In other words, using both wave patterns W2 and W3 in respective planes ZX and YZ, it is possible to achieve a far greater rigidity of each block 5 along longitudinal axis x than would be possible using only wave pattern W2 in plane ZX, and to achieve a far greater rigidity of each block 5 along transverse axis y than would be possible using only wave pattern W3 in plane YZ. This is summed up in the FIG. 8 graph, which shows clearly how, using all three wave patterns W1, W2, W3, it is possible to achieve a far greater rigidity Sx of blocks 5 along longitudinal axis x, and a far greater rigidity Sy of blocks 5 along transverse axis y, than would be achievable using only wave patterns W1 and W2, or wave patterns W1 and W3.

It is important to note that, by adjusting the shape and/or size of wave patterns W2 and W3 in respective planes ZX and YZ, it is possible to adjust the rigidity of blocks 5 along longitudinal axis x and transverse axis y to achieve a given performance of the winter tyre (i.e. to privilege grip on snow and ice, to privilege grip on wet pavement, to privilege grip on dry pavement, or to achieve a well balanced trade-off). In other words, rigidities Sx and Sy of blocks 5 can be adjusted by working on two distinct parameters (wave patterns W2 and W3), thus allowing ample freedom in which to accurately achieve given target rigidities Sx and Sy.

Tests show that, compared with a similar winter tyre with a conventional tread band, a winter tyre with tread band 1 as described shows a more than 10% increase in longitudinal/transverse grip on dry or wet pavement, with no noticeable impairment in grip on snow or ice.

Moreover, winter tyre tread band 1 described is cheap and easy to produce, by involving no appreciable additional cost as compared with a conventional tread band. In fact, the design of sipes 9 simply requires a matching design of the plates fitted to the inside of the curing mold and negatively reproducing the shape of sipes 9 (the plates are stamped from sheet metal and therefore easy to produce, even in complex shapes).

The invention claimed is:

1. A winter tyre tread band comprising:
   a number of longitudinal and transverse grooves defining a number of blocks, each projecting radially upwards from a base surface of the tread band; and
   a number of sipes formed in at least some of the blocks, and each of which extends radially inwards of a corresponding block, from a top surface forming the rolling surface of the tread band;
   wherein, in section, each sipe has a first wave pattern which is constant when the block is sectioned along a first plane defined by the longitudinal axis and transverse axis;
   wherein, along the radial axis, the first wave pattern of each sipe shifts along the longitudinal axis in a second wave pattern which is piecewise linear; and
   wherein, along the radial axis, in addition to shifting along the longitudinal axis in the second wave pattern, the first wave pattern of each sipe also shifts along the transverse axis in a third wave pattern;
   wherein the second wave pattern of the sipes comprises a half-wave originating from a top surface of the corresponding block and having a given length and a given amplitude; and two successive whole waves following the half-wave and each having a length that is double the length of the half-wave and an amplitude that is equal to the amplitude of the half-wave.

2. The tread band as claimed in claim 1, wherein the three wave patterns of the sipes differ in shape and/or size.

3. The tread band as claimed in claim 1, wherein the first wave pattern of the sipes is piecewise linear.

4. The tread band as claimed in claim 1, wherein the half-wave is smaller in amplitude than the whole waves.

5. The tread band as claimed in claim 1, wherein the half-wave is smaller in pitch than the two whole waves.

6. The tread band as claimed in claim 1, wherein the half-wave is oriented the same way as the two whole waves.

7. The tread band as claimed in claim 1, wherein the half-wave is oriented the opposite way to the two whole waves.

8. The tread band as claimed in claim 1, wherein the third wave pattern of the sipes comprise linear segments.

9. The tread band as claimed in claim 1, wherein the tread band comprises at least two rows of lateral blocks and at least one row of central blocks arranged between the two rows of lateral blocks; and wherein the sipes of the central blocks differ from the sipes of the lateral blocks.

10. The tread band as claimed in claim 9, wherein the sipes of the central blocks differ from the sipes of the lateral blocks by shape of the second wave pattern.

11. The tread band as claimed in claim 10, wherein in the central blocks, the half-wave of the second wave pattern of the sipes is oriented differently from the half-wave of the second wave pattern of the sipes in the lateral blocks.

12. The tread band as claimed in claim 1, wherein each sipe is formed starting with the first wave pattern in a first plane defined by the longitudinal axis and the transverse axis, and by moving the first wave pattern, parallel to itself, along the radial axis and, at the same time, by moving the first wave pattern along the longitudinal axis in the second wave pattern, and along the transverse axis in the third wave pattern.

\* \* \* \* \*

UNITED STATES PATENT AND TRADEMARK OFFICE
CERTIFICATE OF CORRECTION

PATENT NO. : 9,994,079 B2  
APPLICATION NO. : 14/432778  
DATED : June 12, 2018  
INVENTOR(S) : Emiliano Sabetti and Massimo Mangia Page 1 of 1

It is certified that error appears in the above-identified patent and that said Letters Patent is hereby corrected as shown below:

On the Title Page

Applicants (71), "Emiliano Sabetti, Rome (IT); Massimo Mangia, Basiglio (IT)" should read --Bridgestone Corporation, Chuo-Ku, Tokyo (JP)--

Signed and Sealed this  
Ninth Day of October, 2018

Andrei Iancu  
*Director of the United States Patent and Trademark Office*